United States Patent Office 3,362,839
Patented Jan. 9, 1968

3,362,839
WAX COATING COMPOSITION CONTAINING N-SUBSTITUTED FATTY AMIDES
Herman F. Weindel, Uniondale, N.Y., assignor to Mobil Oil Corporation, a corporation of New York
No Drawing. Filed Dec. 16, 1964, Ser. No. 418,894
4 Claims. (Cl. 106—270)

The invention relates to wax-containing compositions for coating paper, cardboard, cartons and the like. More specifically, the invention is particularly concerned with such compositions having desirable slip characteristics.

In modern packaging techniques wherein wax coatings are employed, it is essential that the coatings have desirable slip characteristics. This is a term used to denote a sufficiently low coefficient of friction such that an article, as paper and the like, will move freely on contact with another during production, filling and packaging. A number of additives have been tried as slip agents in wax compositions, but few have proven to be efficacious. For example, amides such as oleyl amide and erucamide have been used, but with sacrifice of other desired properties. Thus, when oleyl amide has been used in wax-copolymer coatings, poor heat stability has resulted; this has been evidenced by color degradation dissipation of the slip agent and softening of the coatings. In addition, there has been a serious and significant loss of seal strength.

In the latter connection, paperboard cartons used for packaging of food products such as bacon should be capable of being heat sealed and should have significant heat seal strength. Plies of paperboard suitably coated are held together under light pressure, as about ¼ to 3 pounds per square inch, and are heated to about 200-450° F. to seal the plies one to another. As contemplated herein, "significant heat seal characteristics" denote a seal strength value of at least about 75 grams per inch obtained when two 25 pounds glassine (a thin, dense translucent paper) strips, previously coated and heat sealed to one another at a temperature from about 200° F. to about 250° F. by a heat sealer, are delaminated on an Instron tester at 70° F. and at a rate of 5 inches per minute. A suitable heat sealer is Model 12 AS, Sentinel Laboratory Heat Sealer, made by Packaging Industries. When oleyl amide and erucyl amide are added to wax-copolymer compositions having satisfactory seal strength, slip is improved but, unfortunately, seal strength is substantially destroyed and heat stability is worsened.

It is an object of this invention, therefore, to provide modified wax coating compositions having excellent slip characteristics coupled with other desired characteristics. Another object is to provide such coating compositions which are heat stable. A particular object is to provide such coating compositions having heat stability and excellent seal strength. Additional objects will be apparent from the following description.

In accordance with the invention, the foregoing objects are achieved with compositions containing a petroleum wax and a small amount of an N-substituted amide having the formula:

(1)
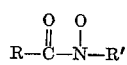

wherein R and R' are selected from the group consisting of saturated, unsaturated and hydroxy-substituted saturated and unsaturated, aliphatic radicals having from about 12 to about 26, preferably 15 to 22, carbon atoms.

The amides of Formula 1 are particularly advantageous in wax coatings modified with a polyolefin such as a polyethylene and/or a polypropylene.

Wax coating compositions containing interpolymers of ethylene and vinyl acetate or ethyl acrylate, such compositions being excellent for hot melt applications, are improved most remarkably by the amides of Formula 1.

Petroleum waxes contemplated herein include paraffin waxes, microcrystalline waxes and intermediate waxes. Particularly preferred, however, are blends of paraffin and microcrystalline waxes.

Paraffin waxes used herein have a melting point from about 120° F. to about 160° F. Preferred, however, are those having a melting point above about 135° F., particularly for gloss stability purposes.

The microcrystalline wax, or mixtures of two or more of such waxes, are obtained from heavy distillate oils or residual lubricating oils by well-known precipitation procedures. The waxes are obtained from solvent solution by cooling the solution to a temperature range of about 40-60° F., the wax product melting at about 150-170° F. Conventional microcrystalline wax can be considered to be comprised of two components. A ceresin wax component is composed predominantly of normal and slightly branched paraffins, and has a melting point of the order of 180-200° F. The lower melting point plastic component, melting points being in the range of 150-180° F., is composed of highly branched and cyclic hydrocarbons.

The amides of Formula 1 can have as R and R' radicals, aliphatic radicals having from about 12 to about 26 carbon atoms, and preferably from about 15 to about 22 carbon atoms. Included among such radicals are palmityl, stearyl, oleyl, erucyl, ricinoleyl, behenyl and gadoleyl. It is to be understood that R and R' can both be saturated, unsaturated or hydroxy-substituted. Excellent results have been obtained, however, when one of the two radicals is saturated and the other unsaturated. Preferred amides are oleyl palmitamide and stearyl erucamide.

The compositions of this invention can also contain a normally solid polyethylene and/or polypropylene, particularly those having an average molecular weight from about 1,000 to about 20,000 (number average). Advantageous is a polyethylene having an average molecular weight of 6000-7000, such as Epolene C-10, a product of Eastman Chemical.

Preferred compositions of this invention contain, with or without a polyethylene and/or polypropylene, an interpolymer or mixture of interpolymers. The interpolymers are formed of ethylene and vinyl acetate or ethyl acrylate. When vinyl acetate is present in the interpolymer or mixture of interpolymers, the monomer concentration thereof should range from about 15 to about 35 percent by weight. Similarly, an ethyl acrylate copolymer should have an ester monomer concentration from about 15 to about 35 percent by weight.

Particularly preferred ethylene/vinyl acetate copolymers for the compositions of this invention are: one having an ethylene/vinyl acetate comonomer ratio of 71-73/29-27 and a Melt Index of 2.5-3.5, such as Elvax 260, and one having a comonomer ratio of 82/18 and a Melt Index of about 150, such as Elvax 420. Other suitable relatex Elvax copolymers, all of which are made by E. I. du Pont de Nemours, are:

| Elvax | Ethylene/Vinyl Acetate Copolymer Ratio | Melt Index |
|---|---|---|
| 210 | 71-73/29-27 | *350 |
| 220 | 71-73/29-27 | 125-175 |
| 240 | 71-73/29-27 | 22-28 |
| 250 | 71-73/29-27 | 12-18 |
| 460 | 81-83/19-17 | 2.5-3.5 |

* Approximately.

A low molecular weight ethylene/vinyl acetate copolymer useful herein is AC 400 (Allied Chemical) having an ethylene/vinyl acetate copolymer ratio of 85/15.

Other suitable ethylene/vinyl acetate copolymers include: DQDA 6225 having a comonomer ratio of about 82/18 and a Melt Index of about 145; DQDA 3269 having a corresponding ratio of about 72/28 and a Melt Index of 17–23, and DQDA 7268 having a corresponding ratio of about 72/28 and a Melt Index of 300–400. The "DQDA" copolymers are marketed by Union Carbide.

As indicated, interpolymers of ethylene and ethyl acrylate are also contemplated herein. These are characterized by an ethylene/ethyl acrylate comonomer ratio of about 70/30 to about 80/20. Typical of such copolymers are: Dow Chemical products EA 2018 and EA 3018, the former having a comonomer ratio of 80/20 and the latter a ratio of 70/30, with each having a Melt Index of 18; and Union Carbide products DPDB 6169 and DQDA 2100 Natural, the former having a comonomer ratio of 82/18 and a Melt Index of 6, and the latter being a purified form of the former. Particularly preferred is EA 3018.

Still other resinous materials can be present in the new compositions. These include thermoplastic hydrocarbon resins, polyterpenes or mixtures thereof. Typical, and preferred, are polymers primarily of alpha- and/or beta-pinene; particularly one having an average molecular weight of about 850. Hydrocarbon resins are illustrated by condensed ring materials such as Piccopale 100. Rosin-based esters such as pentaerythritol and glycol esters of rosin are also contemplated herein. Polyisobutylenes having an average molecular weight of from about 5,000 to about 15,000 (Staudinger method), are suitable. Representative of the latter materials are: a medium soft, low molecular weight polymer of 8,700–10,000 average molecular weight, marketed as Vistanex LMMS by Enjay; and a medium hard, low molecular weight polymer of 10,000–11,700 average molecular weight, similarly marketed as Vistanex LMMH.

Other additives can be used in the new compositions, to impart their customary properties without detracting from the properties achieved with the components already described. Among these are wax-soluble, phenolic antioxidants, which are used in small concentrations. Particularly effective is 2,6-di-tertiarybutyl-p-cresol (Tenox BHT) and a mixture of 2-tertiarybutyl-4-hydroxyanisole and 3-tertiarybutyl-4-hydroxyanisole (Tenox BHA). The Tenox products are marketed by Eastman Chemical.

The compositions contemplated herein are prepared by heating and mixing the various components thereof. Generally, the wax is melted with the antioxidant, and is then heated to 225–275° F. The heated product is stirred while additives are added. The slip agent, identified by Formula 1, is then added.

The outstanding properties of the new compositions are demonstrated by seal strength and heat stability tests. Also shown are strictly comparative tests with other amides serving as slip agents.

Seal strength tests on glassine were determined by the technique described above. A 15 pound per ream coating was applied to glassine, which was heat sealed coating to coating at 250° F. at a dwell time of 1½ seconds and a pressure of 30 pounds per square inch gauge.

Seal strength tests on carton stock (15 point, clay-coated paperboard) were conducted by the following method. Strips of the board were heat sealed on a Sentinel Heat Sealer at 300° F. at a dwell time of 3 seconds and a pressure of 10 pounds per square inch gauge. Test samples of the sealed board were then stored at 70° F. or −40° F. for 24 hours, and then delaminated by hand at either 70° F. or −40° F., respectively. A value of "0%" indicates no adhesion of one board to another; and a value of "100%" indicates no separation of one board from another, but substantially 100 percent fibre tear. An effective seal strength is shown by a value of at least "50%", which is indicative of more than about 50 percent fibre tear of the total surface.

The wax-copolymer composition used for test purposes has a seal strength of 100 percent under the test conditions, but unsatisfactory slip characteristics. It has the following components in percent by weight:

| | |
|---|---|
| Paraffin wax, 150° F. | 60 |
| Copolymer Elvax 260 | 20 |
| Copolymer AC 400 | 5 |
| Polyterpene, molecular weight 850 | 15 |
| Antioxidant ----p.p.m-- | 250 |

Test results are shown in Table I, following.

TABLE I

| Slip Additive | Conc., Percent wt. | Seal Strength After 24 Hours at— | |
|---|---|---|---|
| | | 70° F. | −40° F. |
| None | | 100 | 100 |
| Oleamide | 0.6 | 0 | 0 |
| Erucamide | 0.6 | 0 | 0 |
| Oleyl palmitamide | 0.6 | 100 | 100 |
| Stearyl erucamide | 0.6 | 100 | 100 |

As shown in Table I, seal strength is destroyed when oleamide or erucamide are incorporated in the wax-copolymer composition. Diametrically opposed is the behavior of the N-substituted amides, oleyl palmitamide and stearyl erucamide, since seal strength is retained while excellent slip characteristics are gained.

Heat or thermal stability of a wax-copolymer coating was determined by placing a sample in a glass beaker with several iron nails, and storing the beaker at 300° F. for different time intervals. This test simulate field conditions, since wax compositions are customarily stored in iron melt tanks. Samples with and without a slip additive were so tested, and the samples were withdrawn periodically so that amide content could be determined by infra-red analysis. The wax-copolymer base composition so tested, and in which the slip agents were incorporated, has the following composition (all parts reported are in percent by weight):

| | |
|---|---|
| Paraffin wax, 138–140° F. | 62.5 |
| Microcrystalline wax, 195° F. | 15 |
| Microcrystalline wax, 165–170° F. | 7.5 |
| Copolymer Elvax 420 | 7.5 |
| Polyethylene (Epolene C–10) | 7.5 |

Test results are shown in Table II below.

TABLE II

| Additive | Concentration, Percent wt., After X Hours at 300° F. | | | |
|---|---|---|---|---|
| | X=0 | X=48 | X=120 | X=168 |
| Oleamide | 0.6 | 0.5 | 0.0 | 0.0 |
| Erucamide | 0.6 | 0.5 | 0.4 | 0.1 |
| Oleyl palmitamide | 0.6 | 0.5 | 0.3 | 0.3 |
| Stearyl erucamide | 0.6 | 0.5 | 0.4 | 0.3 |

Results set forth in Table II reveal that oleamide is of little value in the composition in less than 120 hours, and that erucamide is of similar value in less than 168 hours. Considerably superior are the N-substituted amides at the 168 hour test period, since one-half of the amides are still available to provide protection to the composition and to provide other benefits including slip and seal strength.

The compositions shown in Tables I and II, containing either an amide or an N-substituted amide in corresponding concentration, have substantially equal slip characteristics when used under the same conditions. This is demonstrated in Table III following, wherein coefficients of friction are shown. Measurements were made by using a coefficient of friction attachment for an Instron Tensile Tester; measurements were made of a coated surface in contact with a coated surface. The base blend was that described above in connection with Table II.

TABLE III

| Additive | Conc., Percent wt. | Coefficient of Friction ($\mu$) |
|---|---|---|
| Base blend | | 0.8–4 |
| Oleamide | 0.6 | 0.2 |
| Erucamide | 0.6 | 0.23 |
| Oleyl palmitamide | 0.6 | 0.25 |
| Stearyl erucamide | 0.6 | 0.3 |

Proportions of the components present in the compositions of this invention, can be varied considerably depending upon the characteristics desired. Thus, when heat stability is required, the proportions are as follows (in parts by weight):

| | |
|---|---|
| Copolymer and/or polyolefin | 2–40 |
| N-substituted amide | 0.1–2 |
| Petroleum wax | Balance |

When seal strength and heat stability are both sought, the compositions are formed of the following components:

| | |
|---|---|
| Copolymer | 3–40 |
| Resinous material (polyolefin and/or hydrocarbon resin and/or polyterpene and/or rosin-based ester) | 5–30 |
| N-substituted amide | 0.1–2 |
| Petroleum wax | Balance |

This invention has been described with reference to preferred compositions and components therefor. However, it is to be understood that departure from the preferred embodiments can be made within the scope of the specification and claims.

I claim:

1. A coating composition comprising: a petroleum wax having a melting point from about 120° F. to about 160° F.; a polymeric material selected from the group consisting of a polymer of an olefin having from 2 to 3 carbon atoms per molecule and having an average molecular weight of from about 1000 to about 20,000, and an interpolymer containing from about 85 to about 65 percent by weight of ethylene and from about 15 to about 35 percent by weight of an ester selected from the group consisting of vinyl acetate and ethyl acrylate; and a small amount, sufficient to improve the slip characteristics, of the wax-polymeric material composition, of oleyl palmitamide.

2. A coating composition comprising: a petroleum wax having a melting point from about 120° F. to about 160° F.; a polymeric material selected from the group consisting of a polymer of an olefin having from 2 to 3 carbon atoms per molecule and having an average molecular weight of from about 1000 to about 20,000, and an interpolymer containing from about 85 to about 65 percent by weight of ethylene and from about 15 to about 35 percent by weight of an ester selected from the group consisting of vinyl acetate and ethyl acrylate; and a small amount, sufficient to improve the slip characteristics, of the wax-polymeric material composition, of stearyl erucamide.

3. A coating composition comprising: a major proportion of petroleum wax having a melting point from about 120° F. to about 160° F.; from about 3 to about 40 percent by weight of an interpolymer containing from about 85 to about 65 percent by weight of ethylene and from about 15 to about 35 percent by weight of an ester selected from the group consisting of vinyl acetate and ethyl acrylate; from about 5 to about 30 percent by weight of a resinous material; and from about 0.1 to about 2 percent by weight of oleyl palmitamide.

4. A coating composition comprising: a major proportion of petroleum wax having a melting point from about 120° F. to about 160° F.; from about 3 to about 40 percent by weight of an interpolymer containing from about 85 to about 65 percent by weight of ethylene and from about 15 to about 35 percent by weight of an ester selected from the group consisting of vinyl acetate and ethyl acrylate; from about 5 to about 30 percent by weight of a resinous material; and from about 0.1 to about 2 percent by weight of stearyl erucamide.

References Cited
UNITED STATES PATENTS

| | | | |
|---|---|---|---|
| 2,206,046 | 7/1940 | Pollard | 106—243 |
| 2,523,848 | 9/1950 | Schaerer | 260—28.5 |
| 2,877,196 | 3/1959 | Reding | 260—28.5 |
| 3,025,167 | 3/1962 | Butler | 260—28.5 |
| 3,061,493 | 10/1962 | Anderson | 106—270 |
| 3,266,924 | 8/1966 | Haeske et al. | 106—272 |

ALEXANDER H. BRODMERKEL, *Primary Examiner.*

T. MORRIS, *Assistant Examiner.*

UNITED STATES PATENT OFFICE
CERTIFICATE OF CORRECTION

Patent No. 3,362,839

January 9, 1968

Herman F. Weindel

It is hereby certified that error appears in the above numbered patent requiring correction and that the said Letters Patent should read as corrected below.

Column 1, line 37, for "pounds" read -- pound --; lines 60 and 61, the formula should appear as shown below instead of as in the patent:

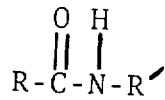

column 4, line 35, for "simulate" read -- simulates --.

Signed and sealed this 18th day of February 1969.

(SEAL)
Attest:

Edward M. Fletcher, Jr.
Attesting Officer

EDWARD J. BRENNER
Commissioner of Patents